(12) United States Patent
Walles (10) Patent No.: US 7,035,210 B2
(45) Date of Patent: Apr. 25, 2006

(54) MEDIA STREAM DELAY MONITORING FOR NODE

(75) Inventor: Erik Walles, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 825 days.

(21) Appl. No.: 09/902,804

(22) Filed: Jul. 12, 2001

(65) Prior Publication Data

US 2003/0012136 A1    Jan. 16, 2003

(51) Int. Cl.
*H04J 1/16*    (2006.01)
(52) U.S. Cl. .................. 370/229; 370/231; 709/238
(58) Field of Classification Search ............... 370/389, 370/392, 229, 230, 235, 236, 395.1, 396, 370/395.2, 395.21, 400, 401, 231; 702/182–185; 709/224, 238
See application file for complete search history.

(56) References Cited

U.S. PATENT DOCUMENTS

| | | | | |
|---|---|---|---|---|
| 4,317,195 A | * | 2/1982 | Barberis et al. | 370/412 |
| 4,320,500 A | * | 3/1982 | Barberis et al. | 370/413 |
| 4,551,833 A | * | 11/1985 | Turner | 370/236 |
| 5,467,342 A | | 11/1995 | Logston et al. | |
| 5,477,531 A | * | 12/1995 | McKee et al. | 370/249 |
| 5,878,032 A | * | 3/1999 | Mirek et al. | 370/252 |
| 5,926,461 A | | 7/1999 | Habermann et al. | |
| 6,275,471 B1 | * | 8/2001 | Bushmitch et al. | 370/248 |
| 6,434,118 B1 | * | 8/2002 | Kirschenbaum | 370/236.1 |
| 6,538,989 B1 | * | 3/2003 | Carter et al. | 370/229 |
| 6,665,271 B1 | * | 12/2003 | Thomas et al. | 370/252 |
| 6,700,893 B1 | * | 3/2004 | Radha et al. | 370/412 |
| 6,704,685 B1 | * | 3/2004 | Bratzdrum et al. | 702/178 |

FOREIGN PATENT DOCUMENTS

EP    1 109 366 A1    6/2001

* cited by examiner

*Primary Examiner*—Wellington Chin
*Assistant Examiner*—Andrew C. Lee
(74) *Attorney, Agent, or Firm*—Nixon & Vanderhye, P.C.

(57) ABSTRACT

A node (20, 20-2) of a packet switching network has a chain of processing units (30) through which a media stream of packets is routed for sequentially processing of each packet of the media stream. Each of the plural processing units of the chain generates an intra-node performance monitoring packet, and sends the intra-node performance monitoring packet to a performance monitoring unit (40) situated at the node. Each intra-node performance monitoring packet includes an indication of time spent by the packet of the media stream in the respective processing unit. The performance monitoring unit provides an indication of delay in the node for the media stream, e.g., the delay experienced at each processing unit of the chain and the overall delay for a packet of the media stream through the plural processing units comprising the processing chain of the node. For each processing unit, the intra-node performance monitoring packet can include plural components, such as a first component attributable to processing and a second component attributable to queuing delay. In case the delay experienced by the media stream packet between processing units of the node is not negligible, the performance monitoring unit acquires (e.g., estimates) a time required for the packet of the media stream to travel between successive processing units using a switch monitor packet. Each of the plural processing units can handle plural media streams, in different sequences if necessary. The performance monitoring unit is capable of providing an indication of delay in the node for each of the plural media streams.

19 Claims, 9 Drawing Sheets

| MEDIA STREAM # 1 | | |
|---|---|---|
| FIRST PROCESSOR (30₁) | QUEUE DELAY | $QD_{1\text{-}1}$ |
| | PROCESSING DELAY | $PD_{1\text{-}1}$ |
| | TOTAL DELAY | $TD_{1\text{-}1}$ |
| SECOND PROCESSOR (30₂) | QUEUE DELAY | $QD_{1\text{-}2}$ |
| | PROCESSING DELAY | $PD_{1\text{-}2}$ |
| | TOTAL DELAY | $TD_{1\text{-}2}$ |
| ⋮ | | |
| FOURTH PROCESSOR (30₄) | QUEUE DELAY | $QD_{1\text{-}4}$ |
| | PROCESSING DELAY | $PD_{1\text{-}4}$ |
| | TOTAL DELAY | $TD_{1\text{-}4}$ |
| OVERALL NODE DELAY | | $OND_1$ |

⋮

| MEDIA STREAM # q | | |
|---|---|---|
| FIRST PROCESSOR (30₁) | QUEUE DELAY | $QD_{q\text{-}1}$ |
| | PROCESSING DELAY | $PD_{q\text{-}1}$ |
| | TOTAL DELAY | $TD_{q\text{-}1}$ |
| SECOND PROCESSOR (30₂) | QUEUE DELAY | $QD_{q\text{-}2}$ |
| | PROCESSING DELAY | $PD_{q\text{-}2}$ |
| | TOTAL DELAY | $TD_{q\text{-}2}$ |
| OVERALL NODE DELAY | | $OND_2$ |

MEDIA STREAM DELAY MONITORING FOR NODE

BACKGROUND

1. Field of the Invention

The present invention pertains the transmission of streams of packets through a communications system, and particularly to measuring packet delay in a node which utilizes packet switching technology.

2. Related Art and Other Considerations

Telecommunications generally encompasses two basic types of switching technologies: circuit switching and packet switching. In circuit switching, network resources are continuously reserved for a connection, even when not transferring data. In packet switching, on the other hand, the network resources are reserved for the connection only when a party desires to transmit or the network is transmitting to the party.

In general, packet switching technology is more efficient than circuit switching technology. On the average, with packet switching technology a large number of connections can be transported over a given physical channel. One part of this transport efficiency is accomplished by dividing the traffic into different priority classes. Traffic sent with high priority is sent before traffic with low priority. Further, traffic is only sent through a packet network when there is some information to convey. Hence, give a large number of connections, it can be shown statistically with packet switching technology that more connections can be supported.

In a node that interfaces packet switched networks it is advantageous to also utilize packet switching methods internally, e.g., in the node itself. Such a node is often characterized by an arbitrary number of processing units interconnected by a packet or cell switched back plane. In general, a packet that enters the node is processed by a number of these processing units and sent between them via the back plane or switch factory.

Typically a packet switched node is operated by service provider as part of a network for the benefit of subscribers and customers. A subscriber or customer might complain if the subscriber perceives the level or quality of service to below what has been agreed (e.g., in contracts) between the service provider and the subscriber. For this and other reasons, degraded performance (e.g., delays) in the node or failures at the node need to be monitored on a node basis, and sometimes even at the processing unit level. For example, the service provider must be able to investigate in order either to verify or otherwise address subscriber complaints or other alleged/perceived problems. The service provider might also be proactive and continuously verify that the traffic model is in compliance with the contracts. In either case, mechanisms are needed to measure the actual performance.

Various techniques have already been developed to determine delay between endpoints of a connection. In this regard, for example, current Asynchronous Transfer Mode (ATM) standards provide for the measurement of cell delays and cell loss using certain operations and maintenance (OAM) cells. OAM cells are routed by the ATM network in the same manner as user cells, but are distinguishable from user cells by special values in their headers. Such OAM cells are inserted into a cell stream of user traffic. In order to measure cell delay, the OAM performance monitoring cell contains an optional timestamp field that is used to indicate the time that the OAM cell is inserted into the stream. That timestamp can be compared with the arrival time of the cell at the virtual connection endpoint, and the difference inferred to be the end-to-end delay experienced by a cell along the virtual connection. As an alternative, an OAM loopback cell can be used to measure rout-trip cell delay between an originating endpoint and a destination endpoint of a connection.

Whereas a major thrust of delay monitoring has been between connection endpoints, delay has also been monitored with respect to an intermediate note of a network. Typically such monitoring has taken the form of inserting per node delay reporting information in a special OAM-type cell, or piggybacking on an existing OAM-type cell. For example, U.S. Pat. No. 5,793,976 to Chem et al. uses a management packet having a payload that can be modified by each node along a virtual connection. The payload of the management packet has one or more delay stamp fields which can be utilized either to report a compilation of delay times throughout the various nodes or to keep track of the delay time for each of plural nodes traversed by the management packet. In similar manner, EP 0993146A2 has a directed load/performance (DLP) message from which a delay seen by each node in the network can be obtained by subtracting timestamps which are inserted in the message by each node as the node processes the message.

What is needed, and an object of the present invention, is a technique for monitoring, at a node, the processing or transport delay in the node itself, particularly when the node is based on a packet backplane or packet switch, or software backplane.

BRIEF SUMMARY OF THE INVENTION

A node of a packet switching network has a chain of processing units through which a media stream of packets is routed for sequentially processing of each packet of the media stream. Each of the plural processing units of the chain generates an intra-node performance monitoring packet, and sends the intra-node performance monitoring packet to a performance monitoring unit situated at the node. Each intra-node performance monitoring packet includes an indication of time spent by the packet of the media stream in the respective processing unit. The performance monitoring unit provides an indication of delay in the node for the media stream, e.g., the delay experienced at each processing unit of the chain and the overall delay for a packet of the media stream through the plural processing units comprising the processing chain of the node.

In an embodiment in which one or more of the plural processing units has an associated (input) queue, the intra-node performance monitoring packet generated for that processing unit includes, as a component of the time spent by the packet in the processing unit, a delay experienced by the packet in the queue. In other words, for such a queue-associated processing unit, the intra-node performance monitoring packet can include several components of the time spent by the packet of the media stream in the processing unit. For example, a first component of delay included in the intra-node performance monitoring packet is a delay experienced by the packet of the media stream attributable to processing performed by processing unit. A second component is a delay experienced by the packet of the media stream attributable to the queue associated with that processing unit.

In some embodiments, routing of the stream of media packets through the node is facilitated by a packet distribution system or switch which interconnects the plural processing units and the performance monitoring unit. In the case that the delay experienced by the media stream packet between processing units of the node is not negligible, the performance monitoring unit acquires a time required for the packet of the media stream to travel between successive processing units. In particular, in one example implementation the performance monitoring unit estimates the time required for the packet of the media stream to travel between a first processing unit and a second processing unit with reference to an inter-unit delay monitor packet generated by the performance monitoring unit. In embodiments wherein the packet distribution system takes the form of a packet switch, the inter-unit delay monitor packet is also known as a switch monitor packet. The performance monitoring unit determines a time required for the switch-monitoring packet to travel between the performance monitoring unit and a selected one of the plural processing units. In one example, non-limiting technique of the invention, the performance monitoring unit estimates the time required for the packet of the media stream to travel between two successive processing units of the processing chain by determining an average transit time of the switch monitor packet between one (e.g., a first) of the two successive processing units and the performance monitoring unit.

Each of the plural processing units can handle plural media streams, in different sequences if necessary. The performance monitoring unit is capable of providing an indication of delay in the node for each of the plural media streams.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
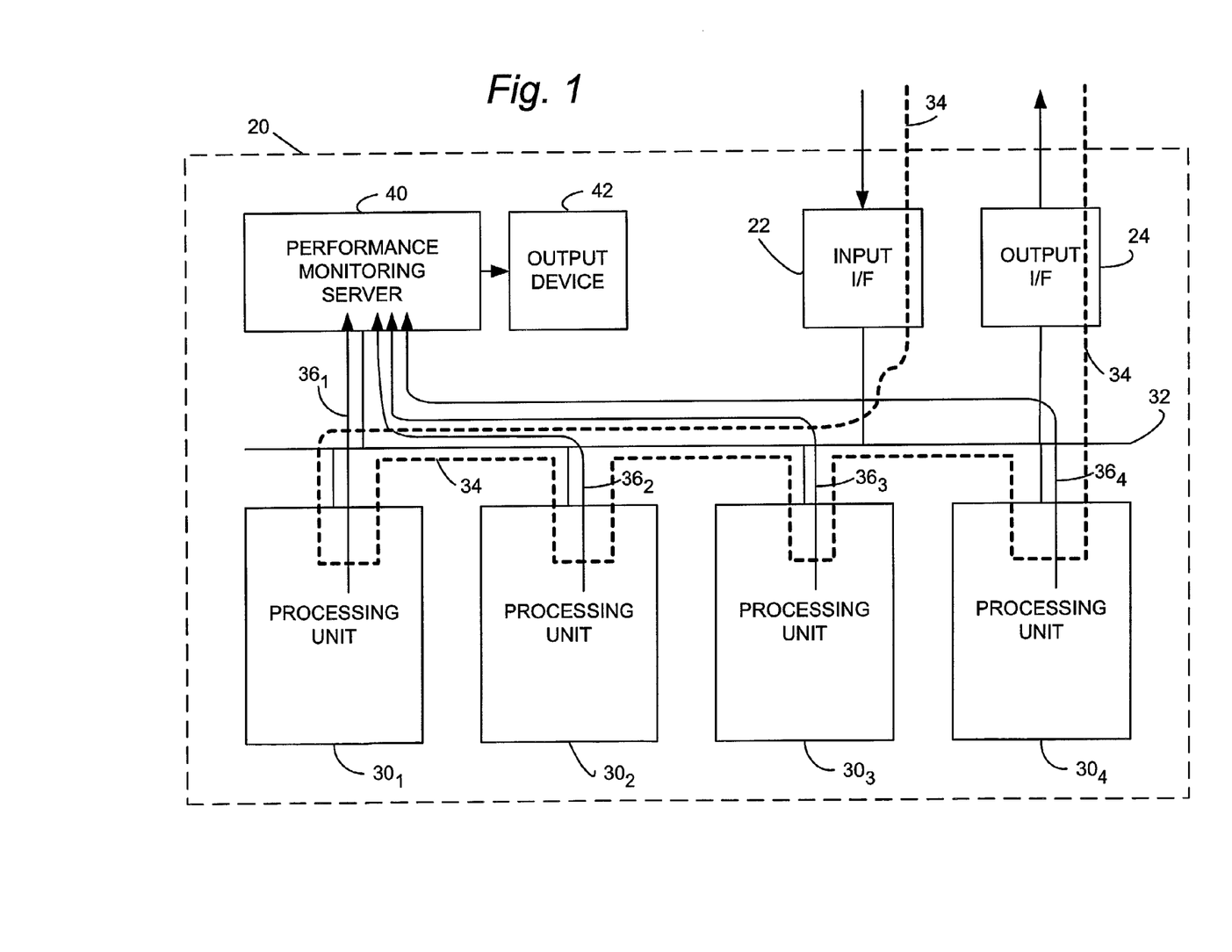
FIG. 1 is a schematic view showing a generic media stream-handling packet switching node which includes performance monitoring of the present invention.

FIG. 1 shows a media stream-handling packet switching node 20 which includes a performance monitoring feature of the present invention. The node 20 forms part of a packet switching network, and therefore can be connected by an input unit 22 and an output unit 24 to other nodes of the packet switching network. The node 20 receives one or more streams of media packets from the network at input unit 22, and upon completion of the processing performed by node 20 discharges the processed packets via output unit 24 to the network.

The node 20 has a chain of processing units through which a media stream of packets is routed for sequentially processing of each packet of the media stream. As a generic, non-limiting example, the node 20 of FIG. 1 is shown as having four such processing units $30_1$ through $30_4$. The input unit 22, output unit 24, and chain of processing units are interconnected by a packet distribution system 32 (e.g., packet switch). The dashed line 34 of FIG. 1 represents an example path or sequence traversed/expenenced by a media stream packet which travels through node 20. After arriving at input unit 22, the packet is routed by packet distribution system 32 successively through each of processing units $30_1$ through $30_4$, and then out of node 20 via output unit 24.

The particular nature of the media processing operations performed at each of the processing units 30 is not germane to the present invention. The person skilled in the art will appreciate that various types of such operations can be performed, depending on the character of the node and type of media stream being routed through the node. A non-exhaustive list of non-limiting examples of media processing operations which can be performed at the processing units 30 of such a node (although not necessarily at the same node for the same media stream) comprises: speech coding; speech decoding; conference call device; tone sending; tone receiving; DTMF sending; DTMF receiving; announcement machine; echo cancellation; FAX modem; voice recognition; U-lag/A-lag conversion; interfacing functionality to an external network; video coded; text processing; a modem for circuit switched data. The processing of media streams generally is described in U.S. patent application Ser. No. 09/695,250, filed Oct. 25, 2000, entitled "Asynchronous Packet Processing Using Media Stream Functions", which is incorporated herein by reference.

In order to monitor delay in each of the processing units 30 of the chain, as well as in the overall delay occurring in the entire chain of processing units, the node 20 of the present invention further includes a performance monitoring unit or server 40. Whereas in the illustration of FIG. 1 the performance monitoring server 40 (and each of the processing units 30) is shown as being situated on a separate board connected to packet distribution system 32, such illustration is not confining. In other words, the units and servers shown in FIG. 1 do not necessarily have to be at different addresses/ports of packet distribution system 32, but could instead be consolidated in various manners as desired.

As a feature of the present invention, each of the processing units 30 of the processing chain generates an intra-node performance monitoring packet, and sends the intra-node performance monitoring packet to performance monitoring server 40. Travel of the intra-node performance monitoring packets from the respective processing units $30_{1-30_4}$ via packet distribution system 32 is shown by lines $36_{1-36_4}$ in FIG. 1. For any given one of the processing units 30, the intra-node performance monitoring packets can be generated at any desired rate, such as (for example) one intra-node performance monitoring packet generated for each media stream packet processed by the processing unit 30, or one intra-node performance monitoring packet generated for every $x^{th}$ (x is an integer) media stream packet processed by the processing unit 30. Each intra-node performance monitoring packet includes an indication of time spent by the packet of the media stream in the respective processing unit 30. In view of its receipt of the intra-node performance monitoring packets, the performance monitoring unit 40 can provide an indication of delay in the node for the media stream, e.g., the delay experienced at each processing unit 30 of the chain and/or the overall delay for a packet of the media stream through the plural processing units 30 comprising the processing chain of the node. Such indication(s) of delay are expressed on an output device 42 connected to performance monitoring server 40.

Figure 2:
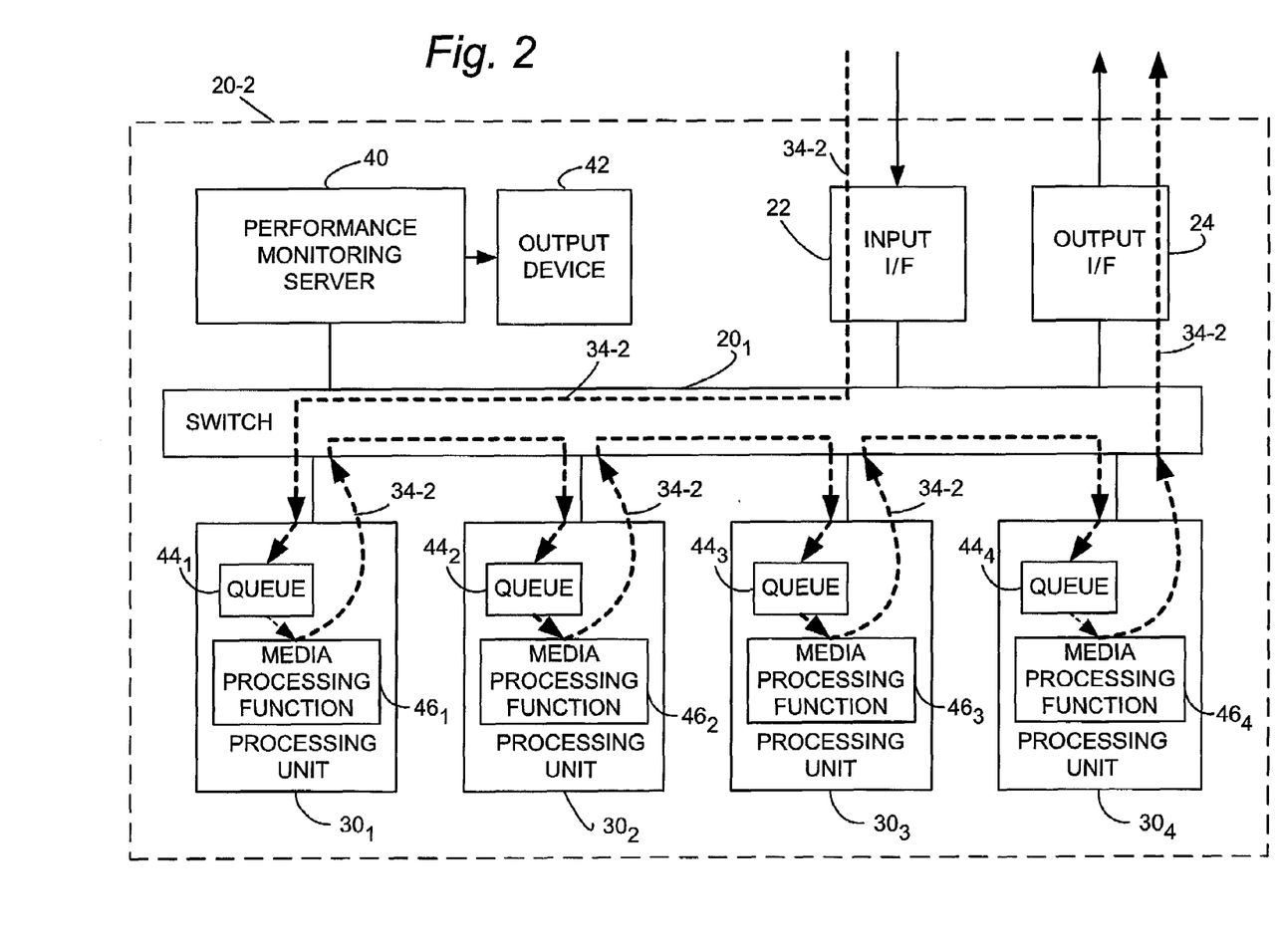
FIG. 2 is a schematic view showing another implementation of a media stream-handling packet switching node which includes performance monitoring of the present invention.

FIG. 2 shows as node 20-2 a particular example implementation of the generic node of FIG. 1. The packet distribution system of node 20-2 is formed by packet switch 32-2. Moreover, in the FIG. 2 embodiment one or more of the plural processing units 30 has an associated (input) queue. In fact, for the example of FIG. 2 each processing unit 30 has both an input queue 44 and a media processing function 46. It should be understood that any number of, and not necessarily all, of the processing units 30 can have an input queue 44. The travel of a media stream packet through the node 20-2, including travel through the various input queues 44 and processing by the various media processing functions 46, is shown by the broken line 34-2 of FIG. 2.

For sake of simplicity, FIG. 2 does not show the intra-node performance monitoring packets which, like in the FIG. 1 embodiment, are generated by each of the processing units 30 for application to performance monitoring server 40. Nevertheless, it should be understood that such intra-node performance monitoring packets are, in fact, generated by each of the processing units 30 essentially in the aforedescribed manner, and/or as described in more detail hereinafter.

Figure 3:
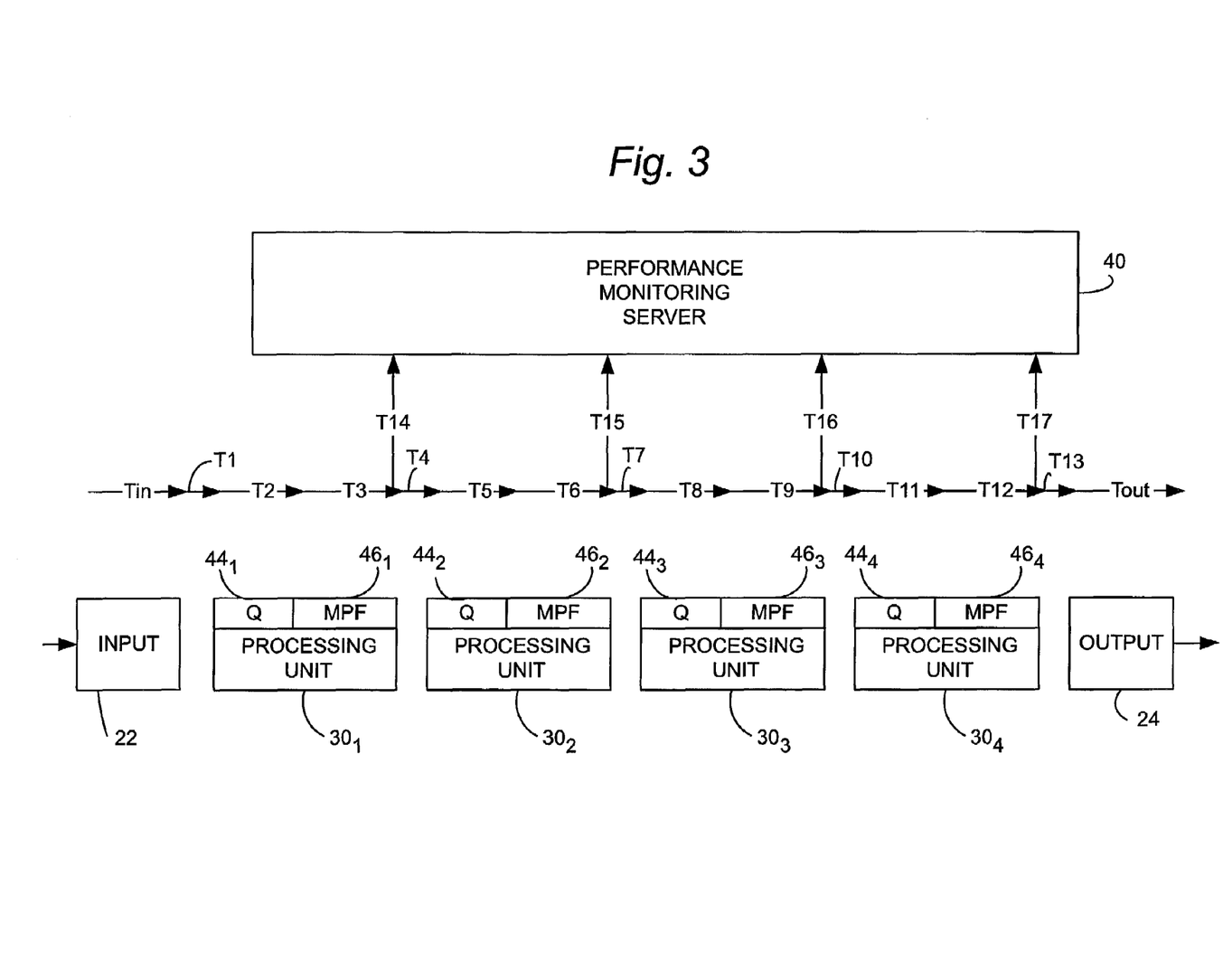
FIG. 3 is a diagrammatic view showing certain delay times potentially encountered in the node of FIG. 2.

FIG. 3 depicts various delays that can occur in the nodes which utilize the invention, such as node 20 of FIG. 1 and/or node 20-2 of FIG. 2. As shown in FIG. 3, a media stream packet experiences a potential delay Tin in input unit 22 and a potential delay Tout at output unit 24. In addition, the media stream packet can experience potential delays T1, T4, T7, T10, and T13 in traveling (e.g., through packet distribution system 32) between the various boards of the node. For example, a delay T4 occurs when a packet travels from processing unit $30_1$ to processing unit $30_2$; a delay T7 occurs when a packet travels from processing unit $30_2$ to processing unit $30_3$; and so forth. A potential delay can also occur at each of the processing units 30.

For a node such as node 20-2 of FIG. 2 which has a queue-associated processing unit, the intra-node performance monitoring packet(s) can include several components of the time spent by the packet of the media stream in the processing unit. For example, the intra-node performance monitoring packet issued from a particular processing unit 30 can include a first component which is a delay experienced by the packet of the media stream attributable to processing performed by processing unit, and a second component which is a delay experienced by the packet of the media stream attributable to the queue associated with that processing unit. For processing unit $30_1$, a delay T2 can be encountered in input queue (Q) $44_1$ while a delay T3 can be experienced in media processing function (MPF) $46_1$. Similarly, for processing unit $30_2$, a delay T5 can be encountered in input queue (Q) $44_2$ while a delay T6 can be experienced in media processing function (MPF) $46_2$, and so forth for the other processing units $30_3$ and $30_4$.

As one of its aspects, the performance monitoring server 40 of the present invention monitors not only the total time spent by a media stream packet in a particular processing unit 30, but also the overall delay of the packet of the media stream through the chain of processing units of the node. For example, for the situation depicted in FIG. 3, performance monitoring server 40 calculates or otherwise determines (1) the times T2+T3; T5+T6; T8+T9, and T11+T12; and (2) the overall time delay T2+T3+T4+T5+T6+T7+T8+T9+T10+T11+T12 which a media stream packet experiences in the processing chain of the node.

If the potential delays T1, T4, T7, T10, and T13 in traveling (e.g., through packet distribution system 32) between the various boards of the node are negligible, the overall delay calculation reduces essentially to T2+T3+T5+T7+T8+T9+T11+T12. On the other hand, if the routing or switch-caused delays are not negligible, in one enhancement of the present invention performance monitoring server 40 also has the capability of determining, or at least estimating, such delays.

In the above regard, an estimation of the routing or switch-caused delays in the node is implemented using one or more inter-unit delay monitoring packets. For embodiments of nodes which have a packet switch for realizing their packet distribution systems, the intra-unit delay monitoring packets are termed as switch monitor packets, (also known herein as switch-monitoring packets). In particular, for the inter-unit delay determination/approximation, for each of the processing units 30 in the processing chain performance monitoring server 40 generates and sends a switch monitor packet. Preferably each such switch monitor packet carries a timestamp which shows, relative to a clock maintained by performance monitoring server 40, its departure time from performance monitoring server 40. Upon receipt of a switch monitor packet, the respective processing unit 30 returns the switch monitor packet to performance monitoring server 40. The arrival time at the performance monitoring server 40 of such a returned switch monitor packet is noted by the performance monitoring server 40. The time required for the switch-monitoring packet to travel between the performance monitoring unit 40 and the selected one of the plural processing units 30 is determined by comparing the timestamp of packet departure with the time of packet reception. Using such determination, performance monitoring server 40 derives an estimate of the time required for a media stream packet to travel from the processing unit 30 to which the switch monitor packet was addressed to a successive processing unit 30 in the chain.

Figure 4:
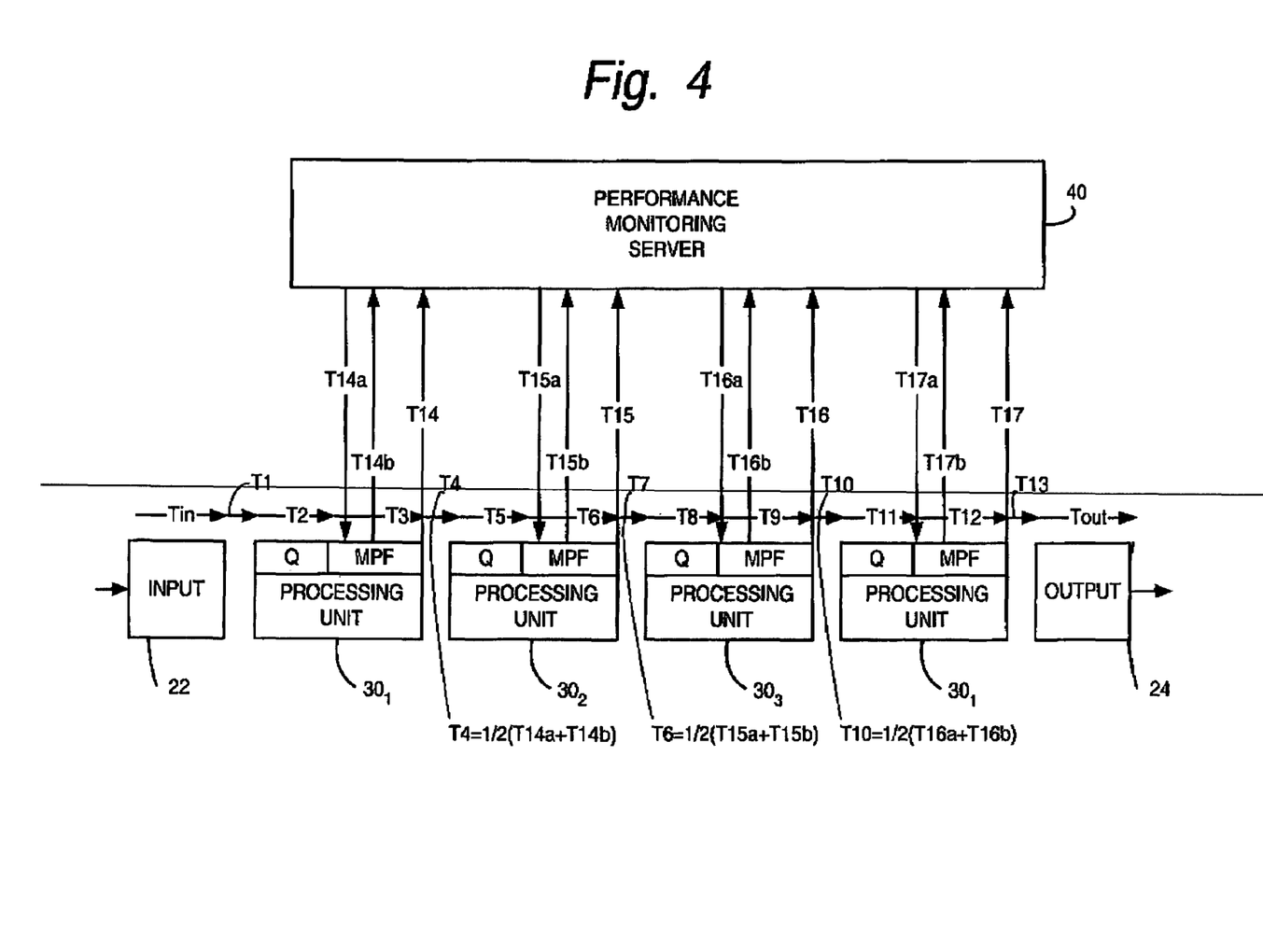
FIG. 4 a diagrammatic view showing the delay times of FIG. 3 as well as switch-incurred potential delay times in the node of FIG. 2.

FIG. 4 illustrates as time T14$a$ the time required far a switch monitor packet to travel from performance monitoring server 40 to processing unit 30$_1$. The processing unit 30$_1$ then (optionally) queues and returns the intra-node performance monitoring packet. FIG. 4 further illustrates as time T14$b$ the time required for a returned intra-node performance monitoring packet to travel from processing unit 30$_1$ to performance monitoring server 40. In one example technique of the invention, the performance monitoring server 40 then derives from the times T14$a$ and T14$b$ an estimation of the time required for the media stream packet to travel from processing unit 30$_1$ to 30$_2$ (e.g., time T4). For example, performance monitoring server 40 may estimate time T4 to be one half of the sum of T14$a$+T14$b$. Similar approximations are derived for other routing-caused delays, e.g., dine T6 can be approximated as one half the sum of T15$a$+T15$b$; time T7 can be approximated as one half the sum of T16$a$+T16$b$; and so forth.

In accordance with another example technique, the time required for the media stream packet to travel between adjacent processing units 30 can be estimated differently. For example, the time T4 can also be estimated in the manner of Expression 1, wherein Expression 1 is: T4=T15$_{arrival\ time}$−T14$_{arrival\ time}$−[T6+T5]. In Expression 1, T14$_{arrival\ time}$ is the time at which the intra-node performance monitoring packet issued from processing unit 30$_2$ arrives at the performance monitoring server 40; while T15$_{arrival\ time}$ is the time at which the intra-node performance monitoring packet issued from processing unit 30$_2$ arrives at the performance monitoring server 40. Using this technique, in general, the overall delay can be calculated in accordance with Expression 2, where Expression 2 is: overall delay=T17$_{arrival\ time}$−T14$_{arrival\ time}$+[T2+T3]. This estimate has a potential error or inaccuracy, since T17 and T14 can have different values (hence the need to estimate T14 and T17 if a very accurate overall delay estimate is required).

Thus, for the scenario of FIG. 4 with its estimations of routing-caused delay times between the processing units 30, the overall time delay can be calculated by: T2+T3+ ½(T14$a$+T14$b$)+T5+T6+½(T15$a$+T15$b$)+T8+T9+/1;2 (T16$a$+T16$b$)+T11+T12.

The foregoing calculation can be even more finely tuned by taking into consideration any significant delay which the switch monitor packet may experience if, as it is in some embodiments, it is queued in a input queue 44 of one of the processing units 30. As understood from FIG. 3 and FIG. 4, for example, performance monitoring server 40 is apprised of the queue delay time for each processing unit 30, and can make an appropriate adjustment to reflect a more accurate round trip delay time.

Figure 5:
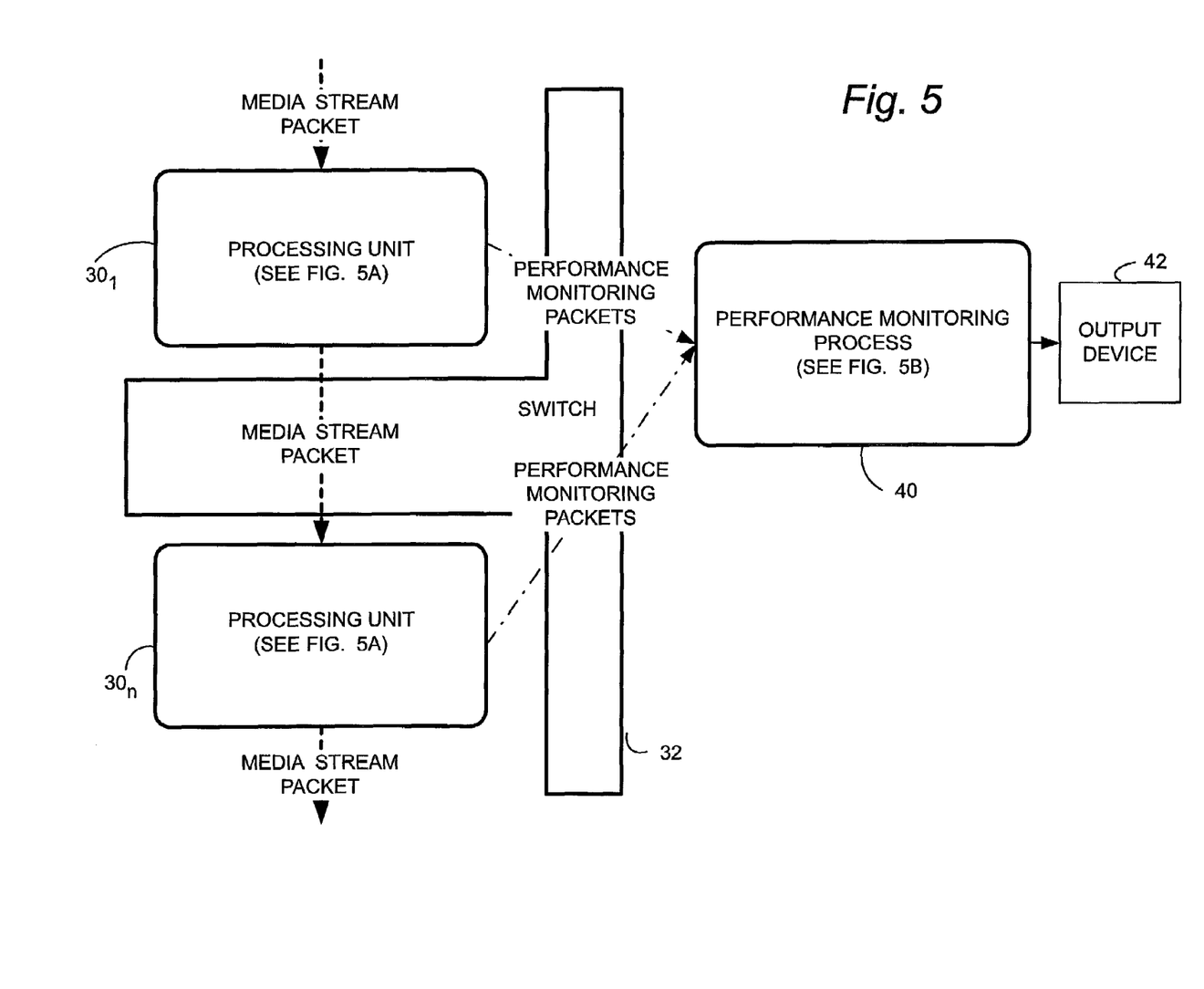
FIG. 5 is a diagrammatic view showing a relationship of processing units, a switch, and a performance monitoring process in accordance with the present invention.

FIG. 5 shows a relationship of processing units 30, switch 32, and performance monitoring process 40 in accordance with the present invention. For an example, non-limiting implementation, FIG. 5A shows general processes and operations performed by the processing units 30, while FIG. 5B shows general processes and operations performed by performance monitoring server 40.

Figure 5A:
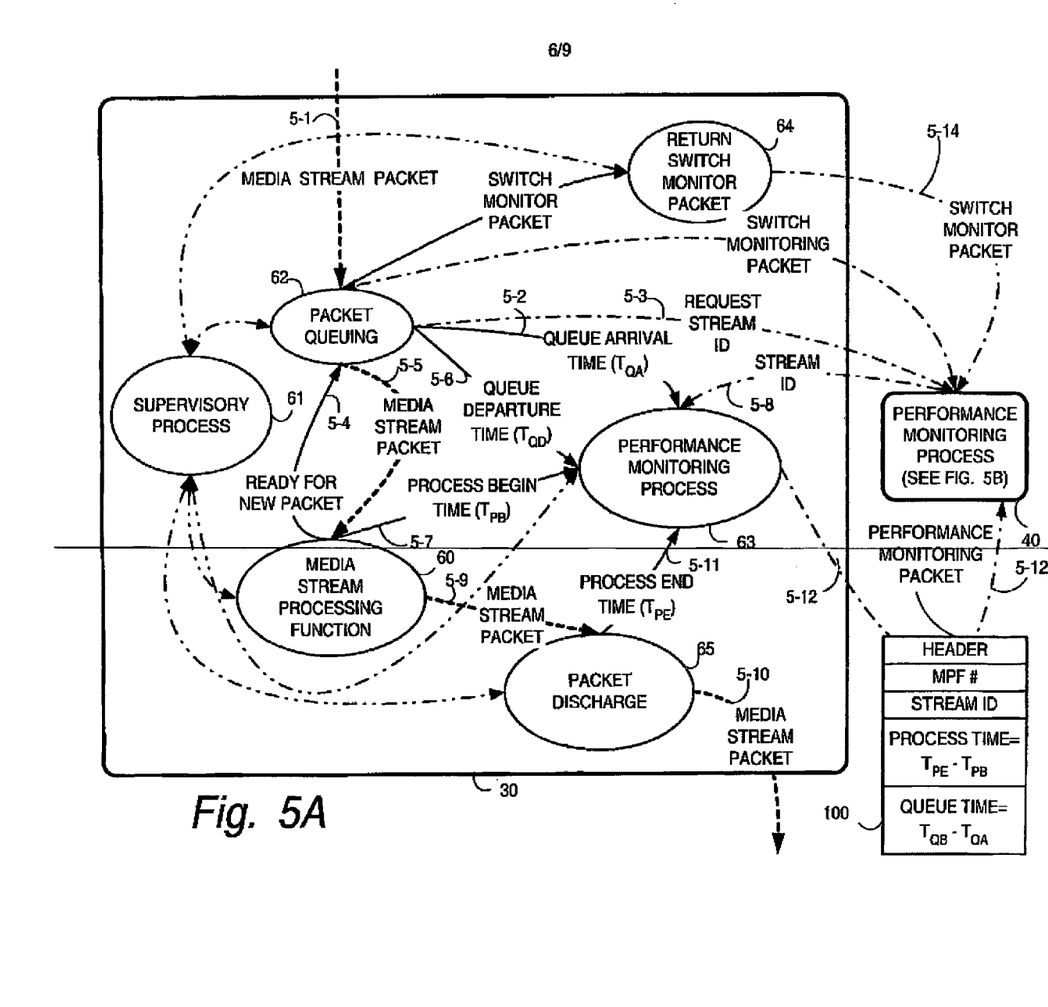
FIG. 5A is a diagrammatic view showing general processes and operations performed by a processing unit of the present invention.
Figure 5B:
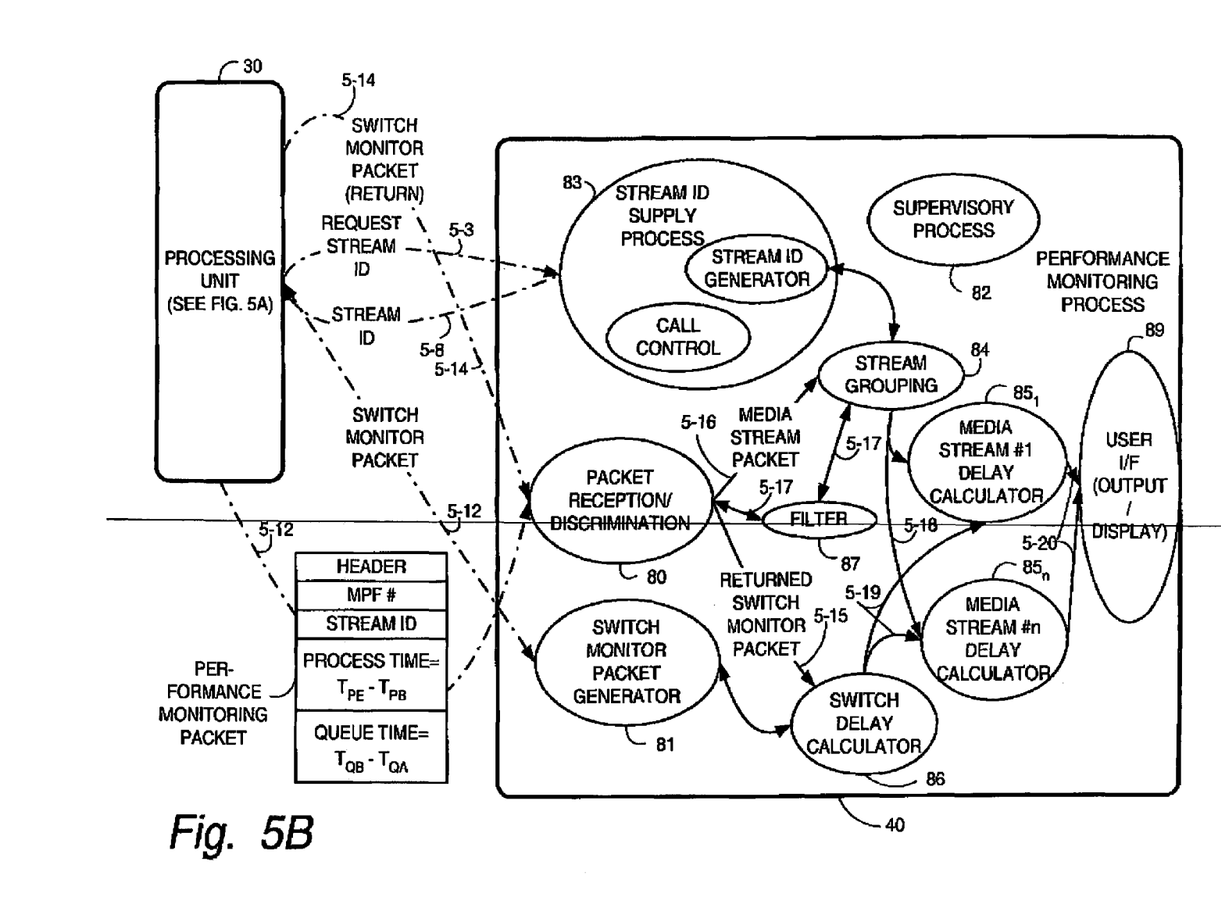
FIG. 5B is a diagrammatic view showing general processes and operations performed by a performance monitoring unit of the present invention.

FIG. 5A illustrates various processes and functions which can be included in an example processing unit 30 of the present invention, and further depicts general processes and operations performed by the processing units 30. FIG. 5A is intended to reflect generally example logic performed at the processing units 30, and not to confine the invention to any particular hardware or software structure. Advantageously, the depiction of FIG. 5A can be common for all processing units 30 regardless of the nature of the media stream processing function.

The processes and functions illustrated in FIG. 5A as comprising a processing unit 30 include media stream processing function 60; supervisory process 61; packet queuing operation 62; performance monitoring process 63; a process 64 for returning a switch monitor packet; and packet discharge process 65. The supervisory process 61 is thus shown in FIG. 5A as being connected by dashed— double dotted lines to each of packet queing operation 62: performance monitoring process 63; a process 64 for returning a switch monitor packet: and packet discharge process 65. The processes and functions illustrated in FIG. 5B as comprising performance monitoring server 40 include packet reception/discrimination process 80; switch monitor packet generator 81; supervisory process 82; stream ID supply process 83; stream grouping process 84; media stream delay calculation processes 85; switch delay calculator 86; filter 87; and user interface (output/display process) 89.

FIG. 5A shows, as event 5-1, an example processing unit 30 receiving a media stream packet from packet switch 32. Consistent with previous illustrations, the path of a media stream packet is shown in FIG. 5A as being a broken line. Depending upon the order of the particular processing unit 30 in the processing chain, the received media stream packet may have been routed by switch 32 from input unit 22 (having just been received from the network), or may have been routed by switch 32 from another (earlier) processor unit in the chain. Upon receipt, the packet queuing operation 62 queues the received media stream packet in its input queue 44, and (as event 5-2) sends the queue arrival time ($T_{QA}$) to performance monitoring process 63.

The packet queuing operation 62, either alone or in conjunction with supervisory process 61, also checks whether the media stream packet has a stream identifier (stream ID). If the media stream packet does not have an stream ID, as event 5-3 processing unit 30 requests a stream ID from performance monitoring server 40. The request for a stream ID is preferably in the form of a special packet which is routed through switch 32, but can also be a signal over a separate control channel (e.g., a signal which bypasses the packet switch). In FIG. 5A and FIG. 5B, communications between processing unit processing unit 30 and performance monitoring server 40 are denoted by dashed/dotted lines.

The stream ID request of event 5-3 is handled at performance monitoring server 40 by stream ID supply process 83 (see FIG. 5B). The stream ID supply process 83 can either use its stream ID generator 83A to generate a unique stream ID for this media stream, or can obtain the stream ID from high level call control (as depicted by symbol 83B in FIG. 5B).

The request for a stream ID, and the fulfilling of such request, may take some time, so the processing at processing unit 30 starts to process the received media stream packet. In this regard, when media stream processing function 60 is ready for a new media stream packet, as event 5-4 media stream processing function 60 sends a ready for new packet message to packet queuing operation 62. Messages which are internal to processing unit 30 are depicted by solid lines in FIG. 5A.

The packet queuing operation 62 sends the new media stream packet to media stream processing function 60 as indicated by event 5-5. Further, the packet queuing operation 62 notes the time at which the media stream packet is extracted from the input queue 44, and as event 5-6 sends the queue departure time ($T_{QA}$) for the media stream packet to performance monitoring process 63.

Upon receipt of the media stream packet sent as event 5-5, as event 5-7 media stream processing function 60 sends the process beginning time ($T_{PB}$) to performance monitoring process 63. The media stream processing function 60 then performs its characteristic process relative to the media stream packet. As mentioned above, that particular process can be any suitable process for a media stream, such as those example processes listed previously.

When the stream ID has been prepared by stream ID supply process 83, the stream ID is transmitted as event 5-8 to processing unit 30. The stream ID is shown in FIG. 5A as being transmitted to performance monitoring process 63. However, it should be understood that the stream ID can also be transmitted to other processes of processing unit 30, such as (for example) packet discharge process 65.

Upon completion of the operation of media stream processing function 60 with respect to the media stream packet, the media stream packet is sent as event 5-9 to packet discharge process 65. The packet discharge process 65 attaches the stream ID to the media stream packet if necessary, and then as event 5-10 dispatches the media stream packet via switch 32 to the next processing unit 30 in the chain. Inclusion of the stream ID in the media stream packet may, in some instances, involve extending the size of the media stream packet. Alternatively, if the processing unit 30 is the last processor in the processing chain, the packet discharge process 65 removes the stream ID from the packet before the media stream packet is sent out via switch 32 and output unit 24 to the external network.

In addition to dispatching the media stream packet, as event 5-11 packet discharge process 65 sends the process end time ($T_{PE}$) for the media stream packet to performance monitoring process 63. The process end time ($T_{PE}$) is the time at which processing unit 30 has completed its processing of the media stream packet.

Upon receiving the process end time (TPE) for a media stream packet, the performance monitoring process 63 is able to prepare an intra-node performance monitoring packet with respect to the media stream packet if authorized to do so. In one mode of the invention, the performance monitoring process 63 can prepare an intra-node performance monitoring packet for every media stream packet processed by a processing unit 30. In another mode, an intra-node performance monitoring packet generated for every $x^{th}$ (x is an integer) media stream packet processed by the processing unit 30. Preferably the second mode is employed in order not to impose too much load on the node. In one example implementation, in such second mode x has a value of about ten. The particular mode (and, for the second mode, the value of x) is communicated to performance monitoring process 63 by supervisory process 61. The involvement of supervisory process 61 in coordinating and controlling the various operations of processing unit 30 are depicted by the dashed/double-dotted lines of FIG. 5A.

FIG. 5A and FIG. 513 show as event 5-12 the transmission of an intra-node performance monitoring packet from performance monitoring process 63 of processing unit 30 to performance monitoring server 40. An example format of an intra-node performance monitoring packet 100 is shown both in FIG. SA and FIG. 513. The intra-node performance monitoring packet 100 has a header or the like which includes, e.g. an origination address (the particular processing unit 30 which generated the intra-node performance monitoring packet) and a destination address (i.e., the address of performance monitoring server 40). In the event that the origination address is insufficient to identify the nature of the processing performed at processing unit 30, a media processing function identifier (MPF #) can also be included in the intra-node performance monitoring packet 100. The intra-node performance monitoring packet 100 further includes The stream ID which, as mentioned above, may have to be sought (in the manner of event 5-3) from performance monitoring server 40. The intra-node performance monitoring packet 100 also includes the delay time components mentioned previously, e.g., the first component (process time) and the second component (queue time). The first component (process time) is computed as the difference between the queue departure time (TQD) for the media stream packet received as event 5-6 and the queue arrival time (TQA) for the media stream packet received as event 5-2.

Like FIG. 5A, FIG. 5B is intended to reflect generally example logic performed at the performance monitoring server 40, and not to confine the invention to any particular hardware or software structure. FIG. 5B shows the intra-node performance monitoring packet of event 5-12 being received (after routing through packet switch 32-2 [see FIG. 5]) at performance monitoring server 40, and in particular at packet reception/discrimination process 80. The packet reception/discrimination process 80 ferrets out intra-node performance monitoring packets received at performance monitoring server 40 from switch monitor packets received at performance monitoring server 40.

In the above regard, it as previously been mentioned that, in one example embodiment of the present invention, performance monitoring server 40 generates inter-unit delay monitoring packets, also known as switch monitor packets. The switch monitor packets are useful for performance monitoring server 40 to derive an approximation of the delay time for a media stream packet occasioned by the routing between processing units 30 of the node. The performance monitoring server 40 includes switch monitor packet generator 81 which periodically generates a switch monitor packet for each processing unit 30 of the node. Such a switch monitor packet is sent as event 5-13 to processing unit 30. The switch monitor packet bears a timestamp reflecting its time of departure from performance monitoring server 40. Typically the switch monitor packet, upon receipt at processing unit 30, is queued by packet queuing operation 62 (see FIG. 5A) in input queue 44 of the processing unit 30. When the switch monitor packet reaches an appropriate position in input queue 44, a process 64 for returning a switch monitor packet does return the switch monitor packet as event 5-14.

When a switch monitor packet is returned (event 5-14), as event 5-15 packet reception/discrimination process 80 forwards the returned switch monitor packet to switch delay calculator 86. The arrival time of the returned switch monitor packet having been noted, switch delay calculator 86 can calculate the round trip travel time for the switch monitor packet (e.g., the total time required for the switch monitor packet to travel from performance monitoring server 40, through switch 32 to processing unit 30, and back again). The switch delay calculator 86 can then use the round trip delay time to form an approximation of the inter-unit delay time. For instance, alluding to the previous example of FIG. 4, to approximate T4 the switch delay calculator 86 can find the average of T14$a$ and T14$b$ (e.g., ½×[T14$a$+T14$b$]).

Upon receiving an intra-node performance monitoring packet, packet reception/discrimination process 80 forwards the intra-node performance monitoring packet to stream grouping process 84 as event 5-16. Since intra-node performance monitoring packets are typically arriving at the node from several media streams, the stream grouping process 84 groups the intra-node performance monitoring packets in accordance with the media streams for which they were generated, using the stream ID as a criteria for such grouping or classification.

Transmission through switch 32, and arrival of intra-node performance monitoring packets at performance monitoring server 40 from plural processing units 30, and for plural media streams, may occasion some jitter. For this reason, filter 87 is utilized to remove the jitter introduced by the sending of intra-node performance monitoring packets through switch 32. Such filtering, which can be performed in conjunction with packet reception/discrimination process 80 and/or stream grouping process 84, is depicted as event 5-17 in FIG. 5B. The arrival time for T14, T15, T16, and T17 also may require filtering. In either filtering case, the filtering method might be taking a simple average of, for example, ten consecutive values. An alternate filtering method might be a simple low pass filter in the form y=0.99y+0.01x.

The filtered and grouped intra-node performance monitoring packets for a media stream are forwarded as event 5-18 to a respective one of media stream delay calculation processes 85 included in performance monitoring server 40. Each media stream delay calculation processes 85 makes a calculation regarding the total delay time occasioned by each processing unit 30, as well as the overall delay time in the node experienced by media stream packets belonging to the respective media stream. For example, for media stream delay calculation process 85$_1$, and assuming that all four processing units 30$_1$–30$_4$ are utilized for the media stream handled by media stream delay calculation process 85$_1$, the overall node delay calculation can be the T2+T3+½(T14$a$+T14$b$)+T5+T6+½(T15$a$+T15$b$) +T8+T9+½(T16$a$+T16$b$)+T11+T12 computation described previously with reference to FIG. 4, or the reduced expression T2+T3+T5+T7+T8+T9+T11+T12 if inter-unit delays are negligible. When the more complex expression is utilized, such switch monitor packet-related quantities as ½(T14$a$+T14$b$), ½(T15$a$+T15$b$), and ½(T16$a$+T16$b$) are obtained from switch delay calculator 86 as event 5-19.

The media stream delay calculation processes 85 can adjust the switch monitor packet travel times in view of the queue delays (queue time), if necessary. For example, if the time delay in input queue 44 of the processing unit 30 is to be considered, it can be subtracted or otherwise accounted for in the computation of the roundtrip delay time. Such queue delay time is known with respect to a processing unit 30 in view of the queue time field of the intra-node performance monitoring packet (see intra-node performance monitoring packet 100 in FIG. 5B).

Thus, each of the media stream delay calculation processes 85 can calculate an overall delay in the node with respect to media stream packets of their respective media streams. Such calculations can be made either essentially continuously or periodically, and fed (as event 5-20) to user interface (output/display process) 89. The user interface (output/display process) 89 format or otherwise manages these calculations for driving output device 42 (see FIG. 1, FIG. 2, and FIG. 5).

Figure 6:
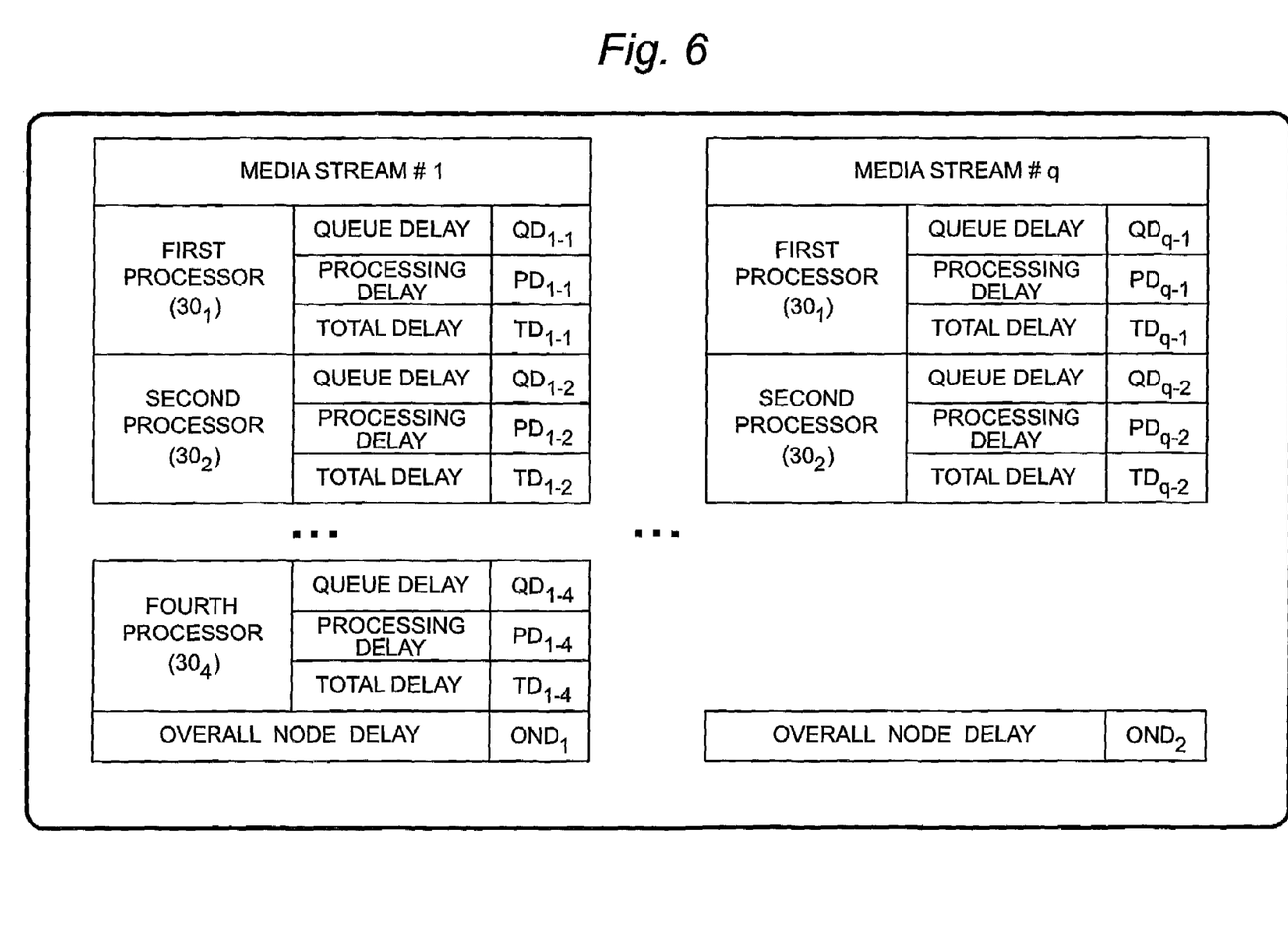
FIG. 6 is a diagrammatic view depicting an indication of media stream packet delay on an output device connected to a performance monitoring server of the present invention.

An example output (e.g., display screen) on output device 42 is shown in FIG. 6. The format of the output of FIG. 6 is merely illustrative, as other formats can be utilized for expressing essentially the same information. From FIG. 6 as well as the foregoing it should be apparent that each of the plural processing units can handle plural media streams. As depicted in FIG. 6, the node handles media streams 1–q, and provides an indication of the queue delay (QD), processing delay (PD), and total delay (TD) with respect to each processor of the chain invoked by the particular media stream, as well as an overall node delay (OND). For the subscripted QD, PD, and OND notations, the first value of the subscript reflects the media stream number, and any second subscript refers to a particular one of the processing units 30.

It was stated above that each of the plural processing units can handle plural media streams. Moreover, the processing units 30 can handle the plural media streams in different sequences if necessary. Further, it may occur that a first subset of the processing units 30 of the chain is involved in handling a first media stream, while a second subset of the processing units 30 of the chain is involved in handling a second media stream. For example, in the first column of the display of FIG. 6 (media stream #1) the subset of processing units comprises processing units 30$_{1-304}$, while for the last column of FIG. 6 (media stream #q) the subset of processing units comprises only processing units 30$_1$ and 30$_2$. In any and all such scenarios, the performance monitoring unit 40 is capable of providing an indication of delay in the node for each of the plural media streams.

While FIG. 6 essentially depicts the delay considerations of a node at a given point in time, it will be appreciated that the output device 42 can also provide other information, such as historical delay information (e.g., a chart or graph showing the changing delay characteristics of the node over time).

Although not specifically shown as such in FIG. 5B for sake of simplicity, it should be understood that supervisory process 82 is in communication with the various other processes, etc., of performance monitoring server 40 for general coordination, control, and supervision of performance monitoring server 40.

The functions of processing unit 30 and performance monitoring server 40 as described above may be implemented using individual hardware circuits, using software functioning in conjunction with a suitably programmed digital microprocessor or general purpose computer, using an application specific integrated circuit (ASIC), and/or using one or more digital signal processors (DSPs)

The present invention advantageously offers a technique for non-intrusive performance monitoring for determining processing delay in an individual node of a packet network. The node can be built with a number of processing units which are interconnected by an asynchronous hardware or software bus. The techniques of the invention advantageously do not require a clock synchronization hierarchy.

Figure 7:
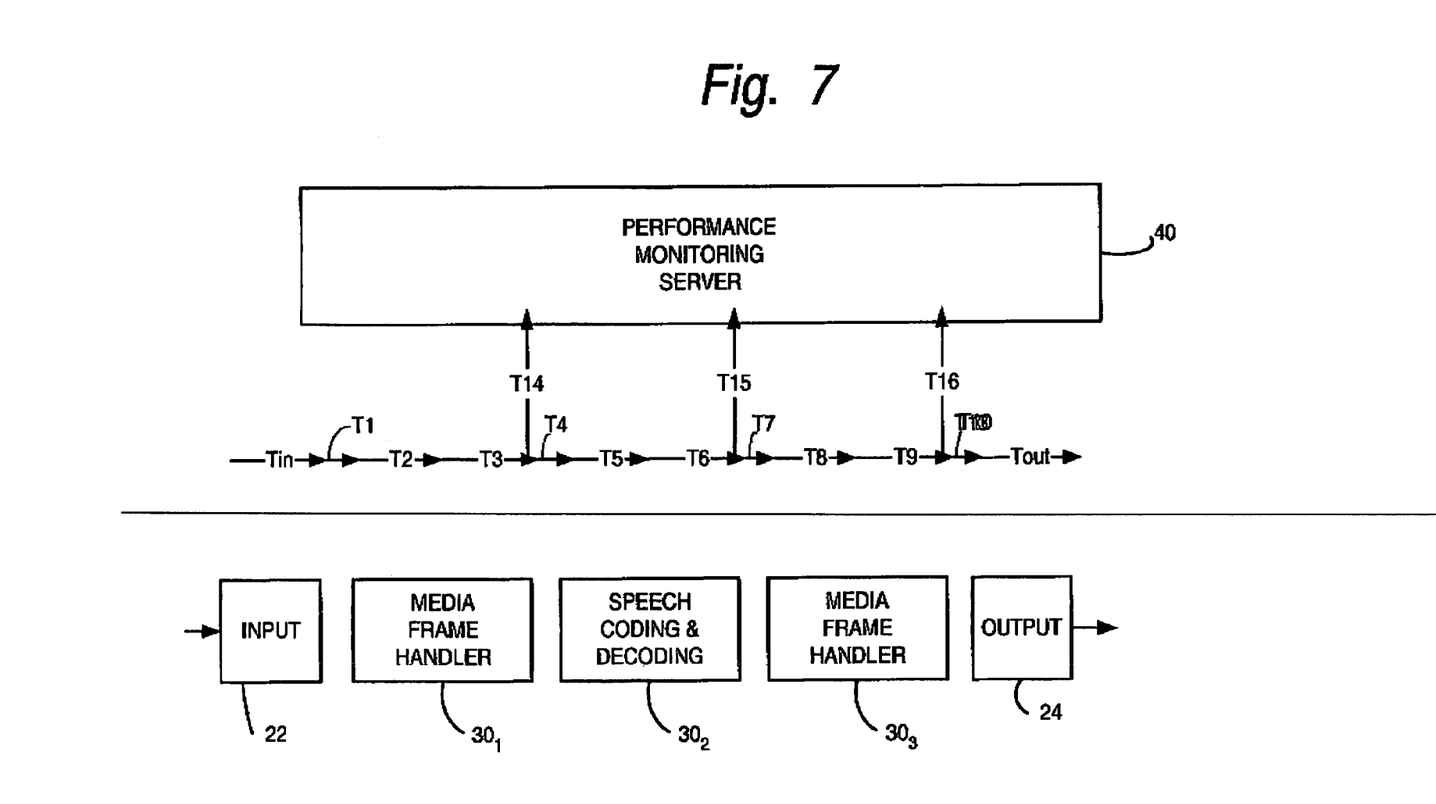
FIG. 7 is a diagrammatic view showing implementation of the techniques of the present invention in an illustrative example context of a UMTS (Universal Mobile Telecommunications) Media Gateway.

Implementation of the techniques of the present invention can occur in diverse contexts. FIG. 7 provides an illustrative example context of implementation which is a UMTS (Universal Mobile Telecommunications) Media Gateway. In the FIG. 7 UMTS Media Gateway implementation, processing unit 30$_1$ and processing unit 30$_3$ host media frame handlers (MFHs), while processing unit 30$_2$ host a speech coding and decoding function. The input unit 22 and output unit 24 take the form of extension terminals (ETs).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A node of a packet switching network which handles a media stream of packets, the node comprising:
   a processing chain comprising plural processing units through which a packet of the media stream is routed, each of the plural processing units generating an intra-node performance monitoring packet which includes an indication of time spent by the packet of the media stream in the respective processing unit;

a performance monitoring unit which receives the intra-node performance monitoring packets generated by the respective plural processing units and which uses contents of the intra-node performance monitoring packets to provide an indication of delay in the node for the media stream.

2. The node of claim 1, wherein the performance monitoring unit uses the contents of the intra-node performance monitoring packets to determine an overall delay of the packet of the media stream through the plural processing units of the node.

3. The node of claim 1, wherein at least one of the plural processing units has an associated queue, and wherein the intra-node performance monitoring packet generated by the at least one of the plural processing units with the associated queue includes a first component and a second component of the time spent by the packet of the media stream in the at least one of the plural processing units with the associated queue, the first component being a delay experienced by the packet of the media stream attributable to processing performed by the at least one processing units with the associated queue, the second component being a delay experienced by the packet of the media stream attributable to the associated queue.

4. The node of claim 1, wherein the performance monitoring unit acquires a time required for the packet of the media stream to travel between a first processing unit and a second processing unit.

5. The node of claim 4, wherein the performance monitoring unit estimates the time required for the packet of the media stream to travel between a first processing unit and a second processing unit with reference to an inter-unit delay monitor packet generated by the performance monitoring unit.

6. The node of claim 5, further comprising a switch which interconnects the processing units and the performance monitoring unit, wherein the inter-unit delay monitor packet is a switch-monitor packet, and wherein the performance monitoring unit determines a time required for the switch-monitoring packet to travel between the performance monitoring unit and a selected one of the plural processing units.

7. The node of claim 6, wherein the performance monitoring unit estimates the time required for the packet of the media stream to travel between a first processing unit and a second processing unit by determining an average transit time of the switch monitor packet between the selected one of the plural processing units and the performance monitoring unit.

8. The node of claim 1, wherein the performance monitoring unit estimates the time required for the packet of the media steam to travel between a first processing unit and a second processing unit by (1) determining a difference between an arrival time at the performance monitoring unit of an intra-node performance monitoring packet from the second processing unit and an arrival time at the performance monitoring unit of an intra-node performance monitoring packet from the first processing unit, and (2) adding a time delay in the first processing unit to the difference (1).

9. The node of claim 1, each of the plural processing units handles plural media streams, and wherein the performance monitoring unit provides an indication of delay in the node for each of the plural media streams.

10. For use in a node of a packet switching network which handles a media stream of packets, a method comprising:

generating, at each of plural processing units comprising a processing chain through which a packet of the media stream is routed, an intra-node performance monitoring packet which includes an indication of time spent by the packet of the media stream in the respective processing unit;

using contents of the performance monitoring packets to provide an indication of delay in the node for the media stream.

11. The method of claim 10 further comprising using the contents of the intra-node performance monitoring packets to determine an overall delay of the packet of the media stream through the plural processing units of the node.

12. The method of claim 10, further comprising including in the intra-node performance monitoring packet a first component and a second component of the time spent by the packet of the media stream in the respective processing unit, the first component being a delay experienced by the packet of the media stream attributable to processing performed by respective processing unit, the second component being a delay experienced by the packet of the media stream attributable to a queue associated with the respective processing unit.

13. The method of claim 10, further comprising transmitting the intra-node performance monitoring packet from the respective processing unit to a performance monitoring unit through a switch.

14. The method of claim 10, further comprising acquiring a time required for the packet of the media stream to travel between a first processing unit and a second processing unit.

15. The method of claim 14, further comprising estimating the time required for the packet of the media stream to travel between a first processing unit and a second processing unit with reference to an inter-unit delay monitor packet generated by a performance monitoring unit of the node.

16. The method of claim 15, wherein the inter-unit delay monitor packet is a switch-monitor packet and further comprising the performance monitoring unit determining a time required for the switch-monitoring packet to travel between the performance monitoring unit and a selected one of the plural processing units.

17. The method of claim 16, further comprising the performance monitoring unit estimating the time required for the packet of the media stream to travel between a first processing unit and a second processing unit by determining an average transit time of the switch monitor packet between the selected one of the plural processing units and the performance monitoring unit.

18. The method of claim 10, further comprising the performance monitoring unit estimating the time required for the packet of the media stream to travel between a first processing unit and a second processing unit by (1) determining a difference between an arrival time at the performance monitoring unit of an intra-node performance monitoring packet from the second processing unit, and an arrival time at the performance monitoring unit of an intra-node performance monitoring packet from the first processing unit, and (2) adding a time delay in the first processing unit to the difference (1).

19. The method of claim 10, wherein each of the plural processing units handles plural media streams, and further comprising providing an indication of delay in the node for each of the plural media streams.

* * * * *